Sept. 20, 1938.    C. BOCKIUS ET AL    2,130,520
FRICTION ELEMENTS
Filed Nov. 20, 1935    3 Sheets-Sheet 3
Fig. 3.
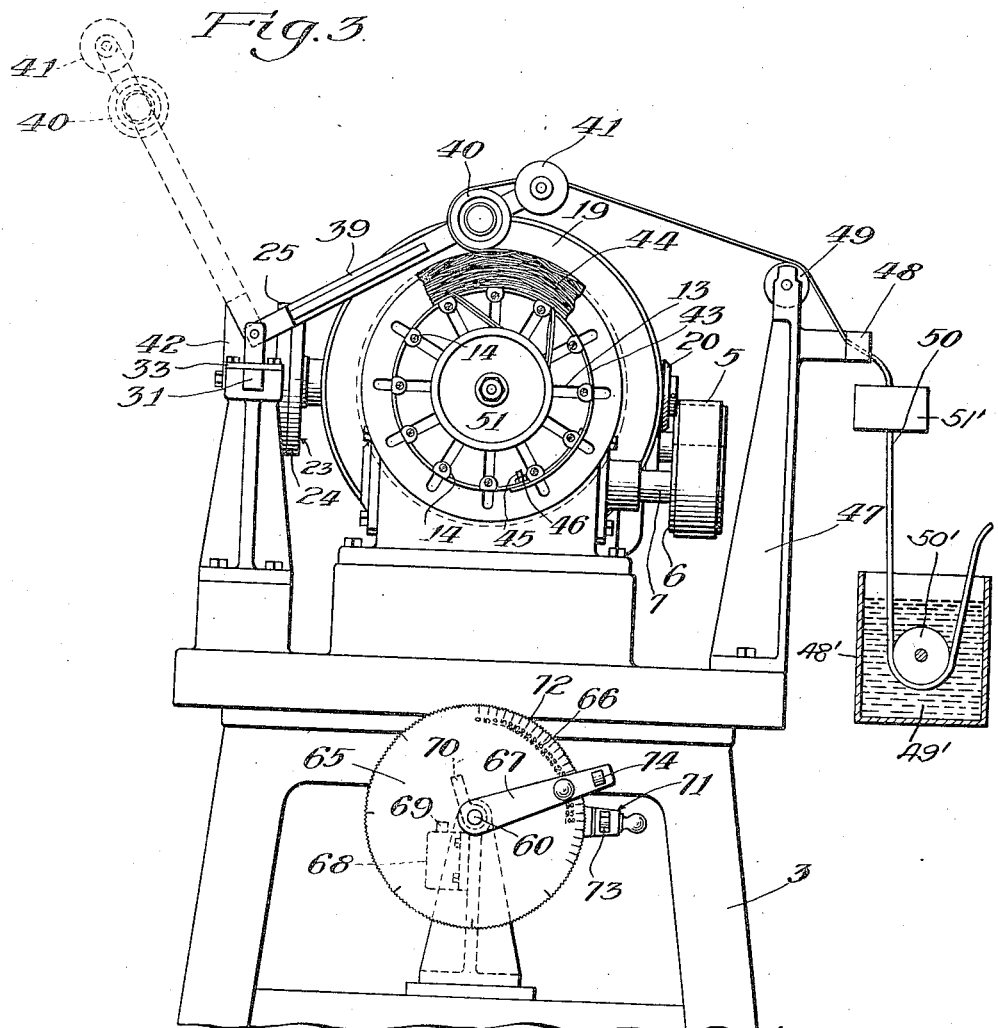
Fig. 4.
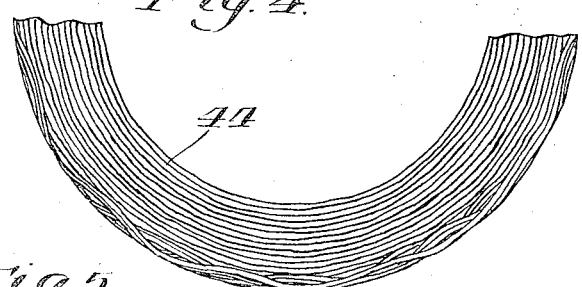
Fig. 6.
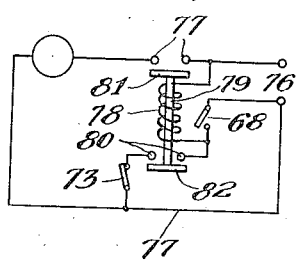
Fig. 5.
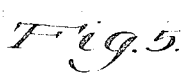
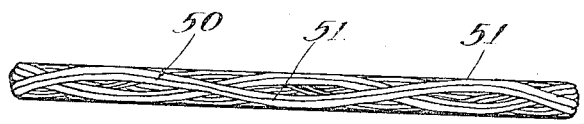
Inventors:
Judson A. Cook,
Chris Bockius
By: Lee J. Gary
Attorney Patented Sept. 20, 1938

2,130,520

UNITED STATES PATENT OFFICE 2,130,520

FRICTION ELEMENTS

Chris Bockius, Stamford, Conn., and Judson A. Cook, Haledon, N. J., assignors to Raybestos-Manhattan, Inc., Passaic, N. J., a corporation of New Jersey Application November 20, 1935, Serial No. 50,802

5 Claims. (Cl. 154—1)

This invention relates to improvements in friction elements for use as clutch facings, brake linings and the like, and to a novel method and apparatus for making the same. The novel product of this invention comprises a structure having no splices, staples or other hard projecting areas of juncture, constructed by endlessly winding fibrous yarn or roving into an endless wound structure.

The invention will be described with particular reference to its embodiment in a clutch facing, but it is to be understood that the invention embraces brake linings as well as clutch facings.

Among the objects of this invention are to provide an endless friction facing devoid of splices, thus eliminating variations in density and insuring uniformity of the facing throughout its entire contact area; to provide a facing having an unusually high resistance to centrifugal force; to provide a facing especially adapted for use with crimped pressure plates; to provide a structure which lends itself to economical manufacture, since there is no cutting or waste of material other than that lost in the grinding operation, which is negligible; to provide a structure in which, due to the peculiar spider-web method of winding and the manner in which the wave form strands fall over and overlap while curing, there is no danger of ply separation; to provide a structure in which the possibility of scoring is eliminated since it has no symmetrical pattern, and in general to provide an improved friction element for the purposes herein described.

Resistance to centrifugal force is becoming more and more important with the growing popularity of high speed engines and clutches, which may be disengaged at these high speeds, with the result that the side holding power of the pressure plate and flywheel plate are removed. This action brings a very high centrifugal force to bear upon the facing which it must resist with its own strength. Since the clutch facing of the present invention is devoid of splices, greater resistance to centrifugal force is obtained and hence the friction facing of this invention is especially adapted for use at the present time.

This invention overcomes the objection of straight wound yarn, in that the loops of each turn, being progressively ahead or behind the previous loops, develop great strength circumferentially and radially.

Facings have been constructed by winding yarn so-called endlessly, wherein the yarn or roving is wound upon itself spool-like without any attempt being made to obtain controlled placing of the yarn with reference to the location of the yarn in the previous turn. These have been found to be deficient in strength to retain the rivets and the strands may have a tendency to unwind or unravel, furthermore the facing may be sheared into separate concentric rings in line with the rivet circle or other sections of the ring which may show a weakness of adhesion circumferentially.

The construction provided in our pattern prevents any possibility of the facing shearing circumferentially at any place, including the rivet circle.

Friction elements made in accordance with the present invention do not nullify the action of crimped pressure plates as do other types of facings which, due to their rigidity, provide no cushioning action to take up the tolerances and irregularities of manufacture of the metal parts of the clutch.

From the viewpoints of economy of manufacture, while the friction element of the present invention has all the advantages of the woven type, the expense of weaving is saved. In addition, since the element has no symmetrical pattern the possibility of scoring is eliminated, as opposed to some types of woven structures heretofore proposed, (when the woven material is coned to form a ring) which have relatively high knuckles or loops in the warp threads which follow each other successively in one circumferential path, causing undue local abrasion or scoring.

The method of manufacturing the product of this invention permits the use of types of yarn which might be impossible to pass through a loom or a friction calender in other types of manufacture.

With the foregoing and other objects in view, we have devised a new friction element and a new and improved method and apparatus for making same, as will be more fully disclosed in connection with the accompanying drawings.

In the drawings,

Fig. 3 is an end elevational view of the machine shown in Figs. 1 and 2.

Fig. 4 is a fragmentary face view of one of the friction facings comprising our invention.

Fig. 5 is an edge view of the facing shown in Fig. 4.

Fig. 6 is a schematic view of the electrical wiring used in our machine.

Our invention involves the forming of friction elements by winding yarn or roving on a suitable form. The yarn or roving may be entirely of fiber, such as asbestos or cotton or combinations of different types of fiber, the preferred yarn or roving being asbestos with sufficient cotton to give it the required strength. Another common type of yarn or roving used in making friction elements is a combination of metal wire, such as brass or copper, with a fibrous material, such as asbestos or cotton or both. Sometimes this type of yarn is formed by winding the fibrous yarn or roving about the wire or the wire and fibrous yarn are twisted together, and this twisted yarn may comprise more than one strand of wire or more than one strand of yarn, as for instance two strands of wire and three strands of fibrous yarn or roving twisted together. After impregnating the yarn or roving with a suitable binder it is preferably dried and wound. The element after being wound is preferably compressed in a suitable mould to give it the desired density and shape.

Figure 2:
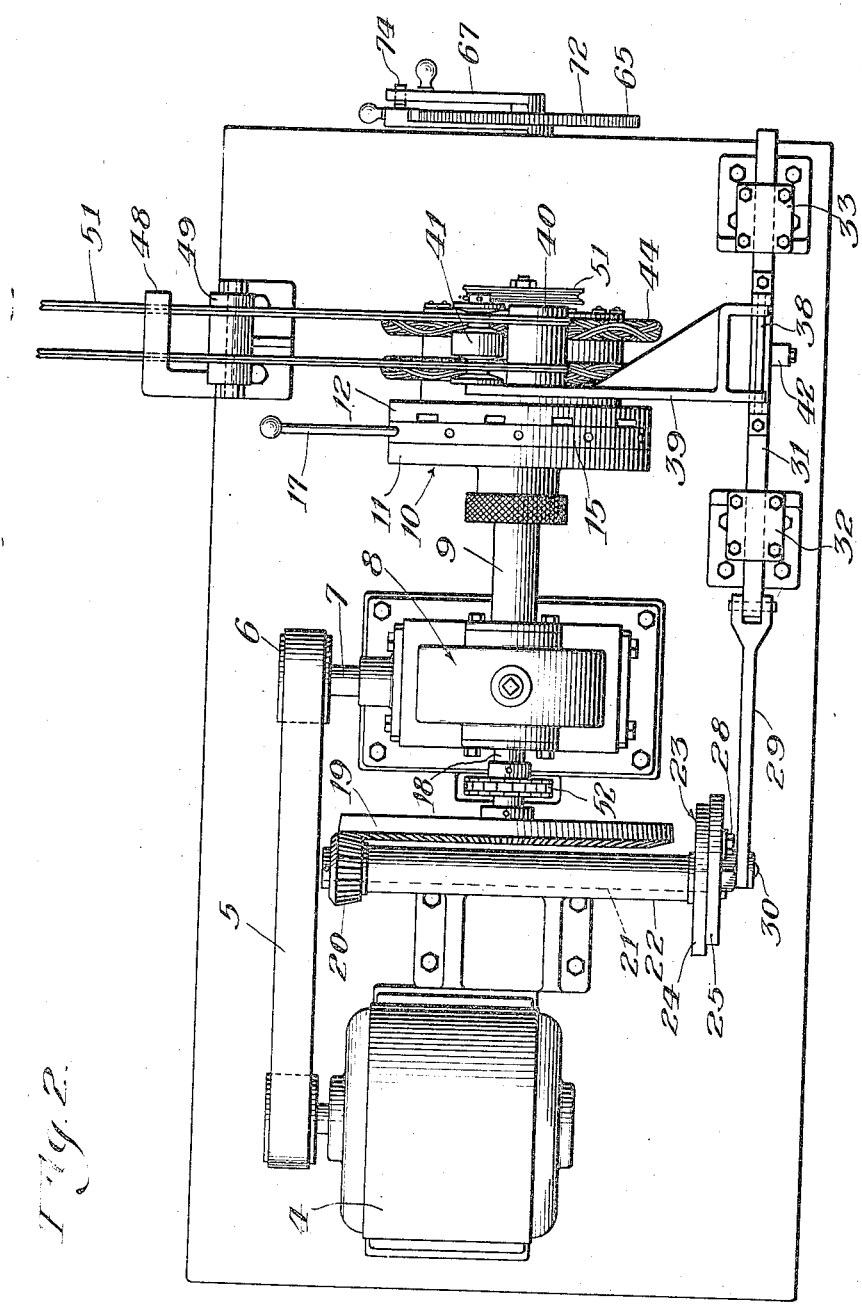
Fig. 2 is a top plan view of the apparatus shown in Fig. 1.

Referring in detail to the drawings, 1 indicates a frame for supporting the machine comprising our invention, said frame being carried by suitable legs or standards 2 and 3. Referring more particularly to Fig. 2, an electric motor 4 may be mounted upon frame 1 and may drive, by means of belt 5, pulley 6 which in turn is mounted upon shaft 7. Shaft 7 is the input shaft of a conventional speed reducer 8 which is also mounted upon frame 1. An output shaft 9 may project from speed reducer 8 and a chuck 10 may be mounted upon the end thereof.

Chuck 10 comprises stationary plates 11 and 12, being the rear and front plate respectively, said last mentioned plate being provided with a plurality of radial slots 13, shown best in Fig. 3. A pin projects outwardly through each of said slots. Interposed between plates 11 and 12 is a circumferentially movable plate 15 which is provided with a plurality of circumferentially spaced recesses 16. The arrangement is such that pins 14, initially all disposed in a circle, are movable in unison radially in said slots, the diameter of the circle formed by the pins increasing or decreasing depending upon the direction of movement of plate 15. For instance, if it is desired to increase the diameter of the pin circle the plate 15 may be moved in one direction by means of the implement 17 which is removably insertable in any of the recesses 16 or if it is desired to decrease the pin circle diameter, the plate is moved in the opposite direction.

Figure 1:
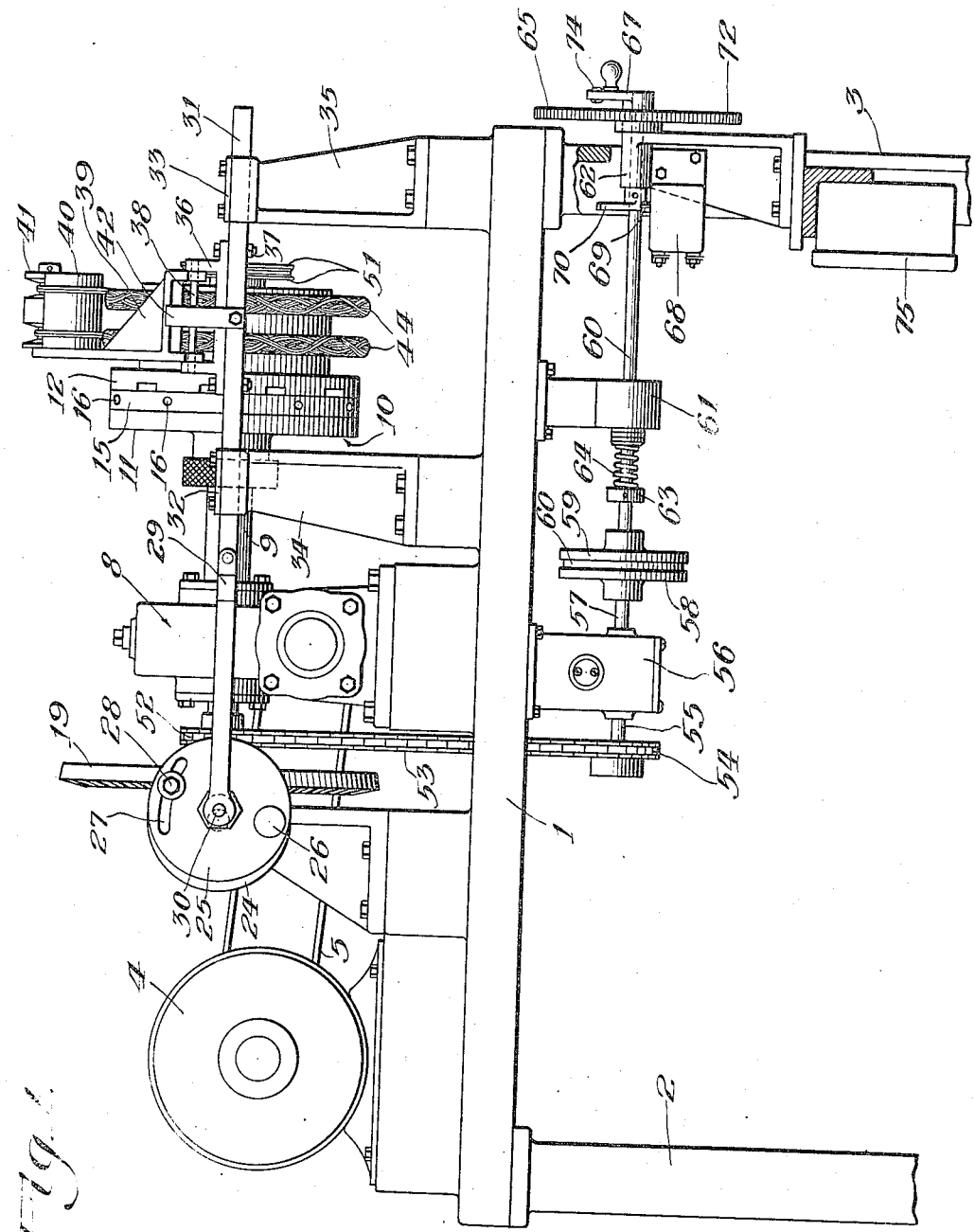
Fig. 1 is a side elevational view of a machine for carrying out our invention.

A shaft 18, a continuation of shaft 9, projects from the opposite side of the speed reducer 8 and carries at its end, a bevel gear 19 which meshes with bevel pinion 20 carried at one end of shaft 21. Shaft 21 may be journalled in sleeve 22 which in turn is supported upon frame 1. An eccentric 23 is carried at the opposite end of shaft 21. Eccentric 23 comprises plates 24 and 25, the former being concentrically mounted upon shaft 23. Plate 25 is pivotally secured to the face of plate 24, as at 26 (Fig. 1), and is provided with an arcuate slot 27, the radius of curvature of which is equal to the distance between the pivot 26 and the slot. A locking screw 28 is mounted upon plate 24 and projects through slot 27 whereby plate 25 can be locked at any desired eccentric position with respect to plate 24.

A connecting rod 29 is pivotally attached to the center of plate 25, as at 30. The opposite end of connecting rod 29 is pivotally secured to slide rod 31 which is slidably positioned in slide bearings or guides 32 and 33, which in turn are carried on standards 34 and 35, respectively, mounted upon frame 1. It can readily be seen that upon motion of gear 19, shaft 31 will be given a reciprocating motion, the frequency of reciprocation of which is dependent upon the gear ratio of gear 19 to pinion 20, and the stroke of which is dependent upon the throw of the eccentric, which, of course, is adjustable by means of plates 24 and 25.

A bracket 36 is mounted, by means of bolt 37, upon the upper face of slide-rod 31 intermediate supports 34 and 35. A pin 38 is positioned between the upstanding portions of bracket 36 and an arm 39 is swingably mounted on said pin. Pressure roll 40 is rotatably mounted adjacent the free end of arm 39 and guide roll 41 is mounted at the end of said arm adjacent roll 40. Arm 39 is free to swing radially toward chuck 10, as shown in full lines in Fig. 3, or said arm may be swung to the position shown in dotted lines in said figure in which position it is supported in substantially upright position by stop 42 carried by rod 31.

A resilient metal band 43 serves as a support for a friction facing 44 being wound on the machine. The band 43 carries a bolt 45 at one end and a slot (not shown) at the other, said bolt being positionable in said slot.

In preparing the machine for the winding of the facing 44, a band 43 of appropriate length is selected. The band is initially rolled to a diameter less than the inside diameter of the facing. Plate 15 is rotated to cause pins 14 to assume a circle less than the inside diameter of the facing. The band 43 is then positioned over said pins and plate 15 is manipulated to cause pins 14 to move radially outwardly. In so doing band 43 is expanded, bolt 45 moving in the slot at the opposite end of the band until said bolt abuts the end of the slot. The band, at this period is of a diameter equal to the inside diameter of the facing and nut 46 is tightened. Of course, for facings of different inside diameters different bands 43 must be used.

The wound structure 44 is removed from the winding machine by rotating disc 16, thereby reducing diameter of spring steel band 43, which allows structure 44 to be removed.

A standard 47 is mounted upon frame 1 at one side of chuck 10, said standard carrying a guide 48 adjacent its end. At the end or top of said standard a roller 49 is mounted. The guide 48 and guide roller 49 are adapted to guide one or more strands 50, of which the facing 44 is constructed, from a source of supply (not shown) to guide roller 41, and over said roller around pressure roll 40 to band 43. Prior to passing the strand or strands 50 over guide roll 49, said strand or strands may be passed through a bath of saturant 49' carried in a suitable vat 48', said strands being carried around roller 50' immersed in said bath. After leaving the bath 49' said strand or strands may be dried as, for instance, by passing the same through a drier 51'. A pair of disks 51 may be mounted concentrically upon the end of shaft 9, both of said disks being dished to provide an annular groove between the peripheries thereof. The purpose of disks 51 is to clamp or pinch the ends of the strands 50 to anchor the same during the winding stage.

The strands 50 may comprise asbestos roving or asbestos yarn with or without wires, the strands being given one or more coatings or rubber or other like cement. The strands may then be dried and subsequently wound on spools or bobbins (not shown) from whence they are fed to our machine. In feeding the strand to the machine, the strands may be passed forwardly singly or two or more strands may be simultaneously wound. Each strand 50 may comprise a single strand of roving or yarn, or two or more single strands may constitute one unit strand 50.

In carrying out the process of our invention, when motor 4 is energized, shaft 9 is driven at a predetermined speed thereby rotating chuck 10. One or more unit strands 50, previously threaded through guide 48 and over rolls 49, 41 and 40 anchored between the disks 51, are thereby wound upon the form or band 43. However, simultaneously with the rotation of shaft 9, shaft 18 is rotated thereby rotating gear 19, which, through the agency of pinion 20, drives shaft 21 and disks 24 and 25, the angular velocity of said disks being dependent upon the ratio of gears 19 and 20. Upon rotation of disks 24 and 25, shaft 31 is reciprocated thereby reciprocating arm 39. Arm 39, of course, carries rolls 40 and 41 and hence strands 50 are moved axially over form 43 simultaneously with the winding of said strands. In this manner facing 44 is built up, the thickness of which is dependent upon the stroke of the shaft or rod 31 and the number of waves or "zig zags" being dependent upon the gear ratio of gears 19 and 20. In this case we use a gear ratio of 3¾ to 1; this gives a pattern in which the loops are ahead of the previous turns or the winding form makes 15 revolutions before a loop is in line with a loop previously wound. As the facing 44 is being wound, roll 40 bears upon the periphery of the facing tending to "knit" or compact the strands, the previous treatment of said strands causing said strands to adhere to each other.

A sprocket wheel 52 is mounted upon shaft 18 and drives sprocket chain 53 which in turn drives sprocket wheel 54 mounted upon input shaft 55 of speed reducer 56. Speed reducer 56 is mounted upon the lower side of frame 1 and has an output shaft 57. The speed ratio of the input shaft 55 to output shaft 57 is in the neighborhood of 300 to 1, that is, 300 revolutions of shaft 55 results in 1 revolution of shaft 57. A clutch plate 58 is mounted upon the end of shaft 57 which makes frictional engagement with plate 59 through the agency of friction material 60. Plate 59 is mounted on one end of shaft 60 journalled in bearings 61 and 62. A collar 63 is mounted upon an intermediate portion of shaft 60 and a coil spring urges said collar and hence shaft 60 and plate 59 toward plate 58 maintaining the same in non-slipping engagement.

A disk 65 may be rigidly secured to bearing 62 and is provided with indicia 66 which divides the disk into a series of equal divisions corresponding to the number of revolutions of shaft 55 or shafts 9 and 18. As arm 67 is mounted on the end of shaft 60 and is adapted to travel adjacent the faces of disk 65 during revolution of shaft 60. An electric switch 68 is mounted adjacent shaft 60 immediately behind disk 65, said switch having a plunger 69. A lug 70 is rigidly secured to shaft 60 and upon counterclockwise motion of said shaft said lug is adapted to depress plunger 69.

An arm 71 is loosely mounted upon shaft 60 and carries knurls or teeth adapted to engage with knurls or teeth 72 carried on the periphery of disk 65 whereby arm 71 may be preset at a desired position upon the periphery of disk 65. Arm 71 also carries a switch having a plunger 73, which, when arm 67 rotates to the position occupied by arm 71, is depressed by roller 74 carried at the end of arm 67. A box 75 contains a relay which is utilized in automatically starting and stopping motor 4, as will be hereinafter more fully described.

Referring particularly to Fig. 6, a diagrammatic view of the electric connections for the automatic control of the machine is shown. A source of electric current is indicated at 76. One side of the line is connected directly by means of conductor 77 to motor 4. The opposite side of the line is connected through switch points 77 to the opposite side of the motor, switch points 77 comprising a portion of the mechanism contained in box 75. A solenoid 78 is also contained in box 75, a movable plunger 79 comprising the core of said coil. Coil 78 is connected across the line through switch 68, which is normally open. One end of coil 78 is connected through switch points 80 and switch 73 to line 77, switch 73 being normally closed. Core 79 carries at its upper portion bridging plate 81 which is adapted to bridge terminals 77 and at its lower end bridging plate 82 adapted to bridge points 80.

In operation, switch 73 is normally closed and switch 68 is normally open. The radial depth of the facing 44 is predetermined and the number of revolutions of the chuck will also be determined. The machine will then be set to perform the predetermined number of revolutions by setting arm 71 at said number upon scale 66. Arm 67 is then moved to zero upon said scale which moves lug 70 into contact with plunger 69 momentarily closing switch 68. Upon closing switch 68 coil 78 is energized moving plunger 79 upwardly, bridging switch points 77 and 80 and closing the motor circuit. Shortly after switch 68 is closed it again opens but inasmuch as points 80 are bridged coil 78 will still be energized. When chuck 10 rotates the necessary number of revolutions arm 67 will have moved to the position where roller 74 contacts plunger 73 thereby opening said switch. This, of course, opens the holding circuit thereby breaking the motor circuit and stopping the motor.

After winding the structure 44 the same may be compressed to the approximate dimensions of the finished facing. The compacted structure may then be placed in molds (not shown) and further compressed and cured to the finished state thereby providing an endless friction element which is ideally adapted for use as a clutch facing or for like uses. Of course, after curing the facings the same are ground and baked or heat treated in the usual manner and rivet holes may be punched therein.

In impregnating the strands 50, as has been hereinbefore described, any of the well known saturants or binders used in the manufacture of friction materials can be utilized, such as, rubber, latex, oxidizable oils, resins, bitumens, colloidal mixtures, or the like. If desired, the first windings of the structure 5 may be saturated with one saturant or a predetermined concentration of a predetermined saturant and the last windings may be saturated with a different saturant or a different concentration of the same saturant, so as to impart different frictional characteristics to different portions of the facing.

While we have specifically described the invention utilizing yarn or roving impregnated with a suitable binder prior to winding, it is to be understood that the invention in its broader aspects includes the winding of unsaturated yarn or roving in which case the wound structure would be saturated as well as the step of saturating or impregnating the wound structure with a suitable binder even when made from previously impregnated yarn.

Also, it is to be understood that instead of compressing the yarn radially with a roller while it is being wound for the purpose of compacting the wound structure means may be provided for imparting tension to the yarn as it is being wound to retain the structure in its wound shape.

We claim as our invention:

1. A method of making a friction facing which comprises, winding a previously impregnated strand comprising asbestos to form an annular ring, and simultaneously with said winding step, guiding said strand in a reciprocating manner to dispose each loop of said strand in plural wave fashion over an adjacent loop thereof and lightly compressing and compacting each loop against an adjacent loop of said ring by aid of a rolling contact during the winding step.

2. A method of making a friction facing which comprises, winding a previously impregnated strand comprising asbestos to form an annular ring, simultaneously with said winding step, guiding said strand in a reciprocating manner a plurality of times for each loop of said ring to dispose each loop of said strand in wave fashion upon an adjacent loop thereof and lightly compressing and compacting each loop against an adjacent loop of said ring by aid of a rolling contact during the winding step.

3. A device for making endless wound friction facings comprising in combination, a frame, a shaft mounted upon said frame, a form mounted upon said shaft, means for rotating said shaft to wind an asbestos strand upon said form, means for guiding said asbestos strand to said form, and means synchronized with the movement of said shaft and form for reciprocating said guiding means a plurality of times for each revolution of said form, said reciprocating means comprising an eccentric, means for driving said eccentric from said shaft, and a slidable member operatively connecting said eccentric and said strand guiding means.

4. A method of making a friction facing which comprises, winding a previously impregnated strand comprising asbestos in a relatively loose fashion to form an annular ring, and simultaneously with said winding step, guiding said strand in a reciprocating manner to dispose each loop of said strand in a wave form which repeats itself a plurality of times, and compressing and lightly compacting each loop radially against an adjacent loop by the aid of substantially frictionless radial contact during the winding step.

5. A method of making a friction facing which comprises winding a previously impregnated strand comprising asbestos to form an annular ring and simultaneously with said winding step, guiding said strand in a reciprocating manner to dispose each loop of said strand in plural wave fashion over an adjacent loop thereof, correlating the winding and reciprocating guidance of the strand so as to dispose the respective waves of adjacent loops out of phase and compressing and lightly compacting each loop radially against an adjacent loop without subjecting the strands of said loops to appreciable tension.

CHRIS BOCKIUS.
JUDSON A. COOK.